July 21, 1959 W. W. HARTZ 2,896,033

PRINTED CIRCUIT ASSEMBLY

Filed Jan. 27, 1955 2 Sheets-Sheet 1

WILLIAM W. HARTZ
INVENTOR.

BY Rudolph J. Juick
ATTORNEY

July 21, 1959 W. W. HARTZ 2,896,033

PRINTED CIRCUIT ASSEMBLY

Filed Jan. 27, 1955 2 Sheets-Sheet 2

WILLIAM W. HARTZ
INVENTOR.

BY Rudolph J. Juick
ATTORNEY

United States Patent Office 2,896,033

Patented July 21, 1959

2,896,033

PRINTED CIRCUIT ASSEMBLY

William W. Hartz, Springfield, N.J., assignor, by mesne assignments, to Daystrom Incorporated, Murray Hill, N.J., a corporation of New Jersey Application January 27, 1955, Serial No. 484,541

3 Claims. (Cl. 200—11)

This invention relates to electrical apparatus and more particularly to apparatus of the type used in the electronic art and commonly referred to as printed or etched circuits.

Printed, or etched, circuits, or parts of circuits, are finding increasing application since they reduce production costs, facilitate the assembly of the complete apparatus and provide a product uniformity which otherwise can only be duplicated, if at all, by the exercise of extremely careful workmanship and rigid inspection. Briefly, printed circuit elements comprise conducting and semi-conducting patterns carried by a supporting plate of suitable insulating material. These patterns, which may constitute lead wires, resistors, capacitors, etc. are intimately united to the insulator plate by various processes well known in the art. In any event, once, the printed circuit component is prepared there remains only the requirement for adding thereto suitable related components, such as switches, electron tubes, etc., to provide a complete operative apparatus.

This invention is direction to a printed circuit deck adapted for use in conjunction with a rotary switch. It is known that the conducting elements of a printed circuit deck can be formed into a variety of specific patterns all directed to reducing the number of components which must be added thereto to complete the apparatus. In this respect, numerous such pattern designs have been proposed for cooperation with a rotary switch carrying resilient blades adapted to condition the circuitry for specific purposes. However, the prior-proposed switching arrangements are open to numerous practical deficiencies, particularly related to the operating life of the assemblage as a whole. Specifically, the sliding movement of the switch blades over the cooperating conducting elements (which actually constitute the stationary contacts of the switch) transfers metallic particles from the conducting elements and burnishes them into the intervening portions of the insulator plate. Within a relatively small number of operating cycles such action reduces the resistance between the conducting elements and, in fact, produces a short-circuit condition. Also, there often occurs a simultaneous transfer of particles of the insulator meterial onto the active surface of the conducting elements necessitating frequent cleaning to maintain proper operation of the circuitry.

It has been proposed to overcome such deleterious action of the switch blade by forming the printed circuit deck so that the exposed surfaces of the conducting elements lie in a plane above the surface of the insulator plate and by reducing to a minimum the spacing between adjacent conducting elements. Such design results in a considerable resistance to movement of the switch blade and causes rapid wear and tear primarily on the blade and also on the edges of the conducting elements. Also, and importantly, the close spacing of the conducting elements seriously restricts the design of the printed circuit deck.

An object of this invention is the provision of a printed circuit component adapted for use with a rotary selector switch, said component being formed in a novel manner to promote trouble-free operation of the assemblage for a period far exceeding that possible heretofore.

An object of this invention is the provision of electrical apparatus comprising printed circuit components having ends terminating in spaced, arcuate relations, a rotary member rotatable about an axis coinciding with the center of the arcuately-disposed ends, and conducting contact members carried by the rotary member and adapted for wiping engagement with said ends.

An object of this invention is the provision of electrical apparatus comprising an insulator plate, current-conducting members carried by the plate, said members having end portions spaced apart on the circumference of a circle, a rotary member having a shaft passing through a hole formed in the plate at the center of the circle, metallic inserts disposed between the spaced ends of the current-conducting members and having surfaces co-planar with those of the conducting members, and a flexible metallic member carried by the rotary member, said metallic member having an arcuate end adapted for wiping contact with the ends of the conducting members and the inserts, the effective length of such arcuate end being greater than the circumferential spacing between the insert and the adjacent end of the conducting member.

An object of this invention is the provision of electrical apparatus comprising a flat plate of insulating material, current-conducting members carried by said plate, said current-conducting members having upper surfaces lying in a plane above that of the adjacent surface of the plate, certain of said conducting members terminating in spaced ends lying on a plurality of concentric circles, a rotatory disc of insulating material including a bearing member passing through a hole in said plate at the center of the said circles, metallic elements carried by the said plate and disposed between the spaced ends of the current-conducting member, said elements having upper surfaces lying in the plane of the similar surfaces of the current-conducting members, and flexible, metallic fingers secured to said disc and adapted for sliding engagement with the upper surfaces of the current conducting members and metallic elements.

These and other objects and advantages will become apparent from the following description when taken with the accompany drawings illustrating the practice of the invention. It will be understood the drawings are for purposes of illustration and are not to be construed as defining the scope or limits of the invention, reference being had for the latter purpose to the claims appended hereto.

In the drawings wherein like reference characters denote like parts in the several views.

Figure 1:
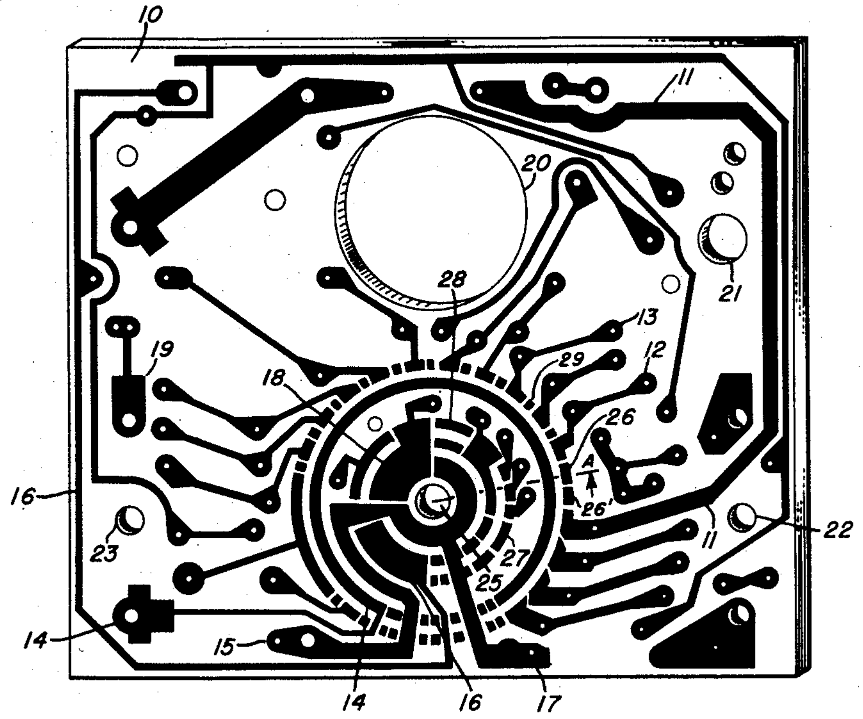
Figure 1 is a perspective view of a printed circuit deck including the inventive feature.

Reference is now made to Figure 1 wherein there is shown a flat plate, or deck, 10 made of a suitable insulating material. Deposited, or otherwise formed, on the surface of the plate are a plurality of current-conducting elements, certain of such elements being identified by the numerals 11–18. Those skilled in this art will understand that some or all of the current-conducting elements may serve as lead wires and may be provided with holes aligned with holes which extend through the plate. These holes are for the purpose of accommodating the leads of components such as resistors, condensers, etc., whereby the leads may conveniently be soldered to the printed-circuit conducting elements. Also, the plate 10 may be provided with numerous holes, such as the hole 20 to accommodate the tubular case of an electrical indicating instrument and the holes 21, 22 and 23 to accommodate mounting studs by means of which the plate may be secured within a housing. The actual formation of the current-conducting elements on the supporting plate and the specific configuration of such elements forms no part of the present invention and it is believed the foregoing description is sufficient for present purposes.

It will be noted that certain of the current-conducting elements have their ends formed to provide a circular configuration. Specifically, the elements 11, 12 and 13 (and others) have their ends extended along the circumference of a circle having the largest diameter; element 14 (and others) have ends formed along a circle of smaller diameter; element 15 (and others) have ends formed on a still smaller diameter circle, etc.; with elements 17 and 18 having ends formed in a circle having the smallest diameter. Each of these circles are concentric with respect to a hole 25 passing through the plate. It will also be noted that numerous current-conducting elements have radially-enlarged ends common to several circles all for the purpose of providing a predetermined circuit selection by means of contact blades adapted for sliding movement along the circumferences of those portions of the conducting elements which lie on the various circles, as will become more apparent hereinbelow.

It may here be pointed out that the upper surfaces of all current-conducting elements lie in one plane and that such plane may correspond to the upper surface of the supporting plate 10, or alternatively, the plane of the elements may be slightly above that of the plate surface. In the former case, that is, where the element surfaces are flush with the plate surface, the wiping, or sliding, movement of a rotary contact blade over the conducting and dielectric portions results in a transfer of metallic particles to the surface of the insulator plate eventually resulting in circuit failure. Also, in the case where the conducting elements extend above the surface of the supporting plate the arcuate movement of the sliding contact from one element to the next results in a rapid wearing of the contact. Either condition reduces the operating life of the assemblage.

The difficulties, described immediately above, do not exist where the sliding contact blade has an end of sufficient length to bridge across adjacent, spaced ends of the conducting elements. However, such continuity switching places serious restrictions upon the design of the printed component circuit and, in fact, renders this particular assemblage entirely useless for certain circuit-switching functions.

I overcome the defects in present printed circuit-switching assemblies by including metallic inserts between the arcuately-disposed ends of the conducting elements such as, for example, those identified by the numerals 26, 27, 28 and 29. These inserts are formed in the same manner as the normal current-conducting elements and are disposed between and insulated from the associated ends of the conducting elements. Their surfaces are coplanar with those of the current-conducting elements and their individual circumferential lengths are determined by the required spacing between adjacent, arcuate ends of the conducting elements. These inserts, then, constitute what may be termed isolated spacers, each of which is disassociated, electrically, from the general circuitry.

Figure 2:
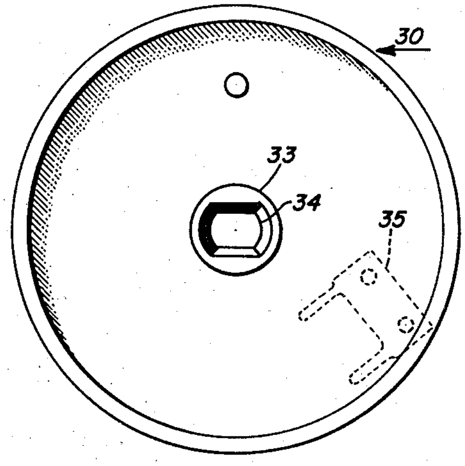
Figure 2 is a top plan view of the rotary switch member.
Figures 3, 4:
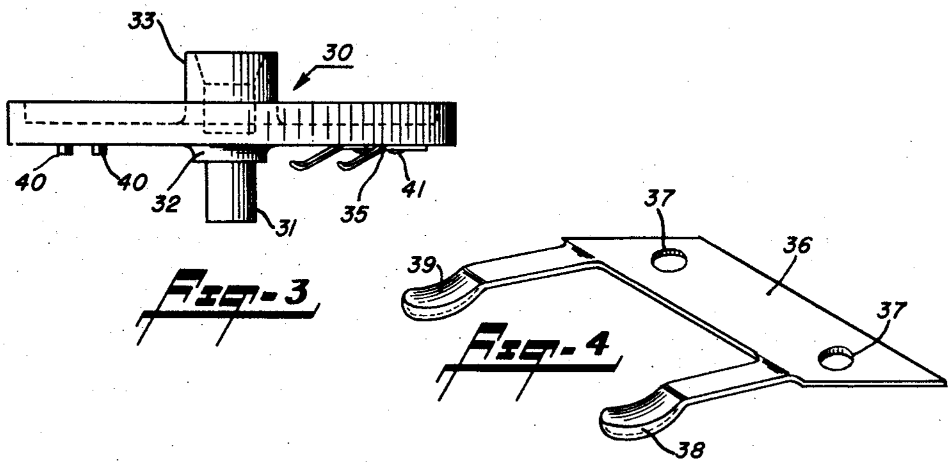
Figure 3 is a side view of the same.
Figure 4 is an enlarged, perspective view of a contact blade carried by the rotary member.

Reference is now made to Figures 2 and 3 which illustrate the rotary member designed for cooperation with the arcuately-formed ends of the conducting elements to form a switch. Such member comprises a molded plastic disc having a lower shaft 31 extending from an enlarged diameter hub 32 and an upper shaft 33 provided with a generally rectangular bore 34. Secured to the lower surface of the disc are a plurality of flexible contact blades 35, one such member being shown in the drawings. As shown in the enlarged view of Figure 4, each contact blade, formed of a relatively thin sheet of spring material, such as phosphor bronze, comprises a base portion 36 provided with apertures 37 and a pair of downwardly-extending fingers having arcuate ends 38 and 39. The lower surface of the rotary disc includes integral pins 40 arranged in pairs and suitably positioned for the proper orientation of the contact members 35. Each contact blade is adapted to be secured to the disc by merely inserting the pair of pins through the blade apertures 37 and then applying heat to the protruding pin ends to thereby form enlarged heads, as shown by the head 41 in Figure 3.

Figure 5:
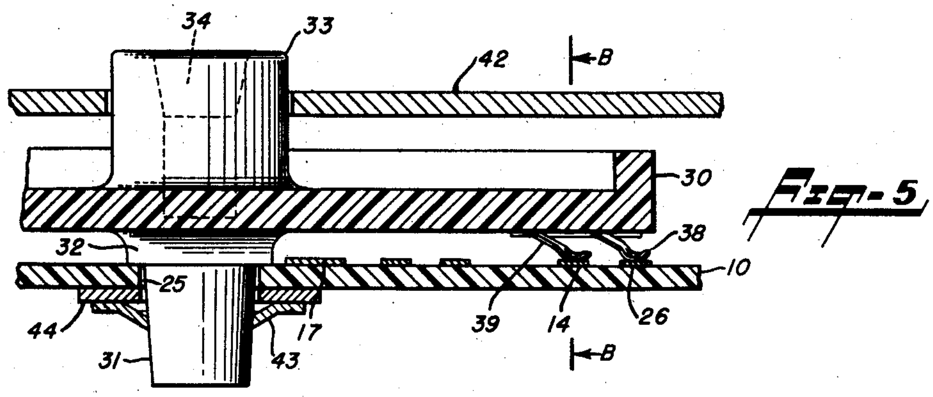
Figure 5 is a fragmentary, sectional view taken along the line A—A of Figure 1 and showing the rotary switch member in assembled position relative to the printed circuit plate.

The lateral spacing of the arcuate fingers of each contact blade 35 is determined by the specific purpose to be served by the particular contact blade. This will be apparent from Figure 5 which is a partial sectional view taken along the line A—A of Figure 1. Here the rotary disc 30 is shown in assembled position relative to the printed circuit deck 10. It will be noted that the disc shaft 31 passes through the hole 25 in the insulator plate (see also Figure 1) and that the spacing between the disc and the plate is set by the disc hub 32. In the assembled device, the deck 10 is spaced from an upper panel 42, secured in fixed position, and provided with a hole for accommodating the upper shaft 33 of the disc. In this manner, the rotary switch component is held in proper position for rotation by means of a suitable knob having a stem inserted into the rectangular bore 34 formed in the upper end of the shaft 33. In the assembled unit, the flexible fingers 38, 39 of the contact member will slide along the exposed surfaces of the conducting elements carried by the plate 10. In the particular showing of Figure 5, the contact finger 38 rides along the largest diameter circle that includes the isolated insert 26 while the associated contact finger 39, radially spaced therefrom, rides along the adjacent smaller diameter circle that includes the current-conducting element 14. Other spacings of the fingers of other contact blades are provided to radially bridge predetermined circles to thereby provide a maximum circuit-switching flexibility. The rotary disc 30 is secured in operating position to the printed circuit deck 10 by means of a spring washer 43 pressed over the bearing shaft 31 and against the flat washer 44, such spring washer being secured to the shaft by means of radially-extending, axially-offset fingers that bite into the shaft, as is well known in this art. The hub 32 maintains a fixed spacing between the disc 30 and the deck 10 and the fingers of the contact blades are offset accordingly to provide a good pressure contact with the ends of the conducting elements. To further promote a good electrical contact the engaging surfaces of the blade fingers and the conducting elements may be silver plated.

Figure 6:
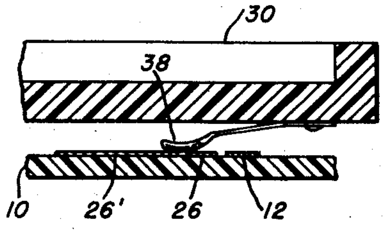
Figure 6 is a fragmentary view, taken substantially along the line B—B of Figure 5.

Inasmuch as a definite spacing gap exists between adjacent, arcuate ends of the current-conducting members and the isolated inserts, I form the ends of the contact fingers in such manner that the circumferential length thereof is longer than the corresponding dimension of the gaps. This is shown in Figure 6 which is a fragmentary sectional view taken along the line B—B of Figure 5. Here, the contact finger 38 is shown bridging the gap between the isolated insert 26 and the adjacent end of the conducting element 12. Thus, as the finger moves from insert 26 to conducting element 12, it does not touch the insulator plate 10. Similar desiderata apply to all contact fingers regardless of their radial dimension from the axis of rotation of the disc. Consequently, rotation of the switch disc results in a smooth, sliding action of the contact fingers over the underlying members, thereby promoting good electrical contact characteristics and long, trouble-free operating life. At the same time the disposition of one or more of the electrically isolated inserts between adjacent ends of the actual current-conducting elements provides a complete circuit break during the switching function thereby affording a maximum flexibility of printed circuit design. Still further, when a higher voltage breakdown test is required between adjacent ends of conducting elements this may be accomplished by inserting two or more isolated inserts between such element ends, as evidenced by the inserts 26 and 26' shown in Figure 1.

Having now described my invention in detail in accordance with the requirements of the patent statutes, what I desire to protect by Letters Patent of the United States, is set forth in the following claims.

I claim:

1. Electrical apparatus of the class described comprising a flat plate of insulating material having a hole extending therethrough, a plurality of current-conducting members carried on the upper surface of the plate and forming parts of the electrical circuit of the apparatus, said conducting members terminating in ends spaced apart along a plurality of circles concentric to the hole in the plate, a rotary disc including a lower shaft passing through the said hole in the plate and an upper shaft, a fixed panel spaced from the plate and having a hole accommodating the upper shaft of the disc, spring means biasing the said disc toward the plate, metallic inserts disposed in the circumferential spaces between adjacent ends of the conducting members of said circles, said inserts being electrically isolated from the current-conducting members and the circuitry, and flexible contact fingers made of spring material and secured to the lower surface of the disc, each of said fingers being adapted for sliding contact with the conducting member ends and inserts oriented along a given circle and each finger having a length exceeding the spacing between adjacent inserts and conducting member ends.

2. Elecrical apparatus of the class described, comprising a flat plate of insulating material having a hole extending therethrough, a plurality of current-conducting members carried on the upper surface of said plate and forming parts of the electrical circuit of the apparatus, said conducting members terminating in ends spaced apart along a plurality of circles concentric to the hole in the plate, a rotary disc including a lower shaft passing through said hole in the plate and an upper shaft, a fixed panel spaced from the plate and having a hole accommodating said upper shaft, a spring washer pressed over the lower bearing shaft to resiliently urge said plate toward the disc, metallic inserts disposed in the circumferential spaces between adjacent ends of the conducting members of said circles, said inserts being electrically isolated from the conductive members and the circuitry, and a flexible contact plate formed of a relatively thin sheet of spring material, having a base portion provided with apertures for securing it to said rotary disc, and a pair of downwardly-extending fingers having arcuate ends, the lower surface of the rotary disc including pins suitably positioned for reception in the apertures of said base portion for holding said contact plate in place, each of said arcuate ends being adapted for sliding contact with the conducting member ends and inserts oriented along a given circle, with said contact plate bridging the distance between said circles, and having a length exceeding the spacing between adjacent inserts and conducting member ends.

3. Electrical apparatus of the class described, comprising a flat plate of insulating material having a hole extending therethrough, a plurality of printed circuit members carried on the upper surface of said plate and with arcuately formed end portions arranged along a pair of circles concentric about said hole, certain of the members which are arranged along the outer circle extending outwardly from end portions to function as conductors for connecting with other parts of an electrical circuit, a molded plastic disc having a shaft extending from an enlarged diameter hub and passing through said hole in the plate, said hub engaging said plate around the hole, a spring washer pressed over the shaft to resiliently urge said plate toward said disc, a contact blade formed of a relatively thin sheet of spring metal having an apertured base portion and a pair of downwardly extending fingers bridging the distance between said circles, and a pair of pins extending from the lower surface of said plastic disc and received in said apertured contact blade to hold said blade in place on said disc.

References Cited in the file of this patent

UNITED STATES PATENTS

| | | |
|---|---|---|
| 1,418,674 | Risk | June 6, 1922 |
| 1,768,299 | Simon | June 24, 1930 |
| 2,163,919 | Siegel | June 27, 1939 |
| 2,481,033 | Nelson | Sept. 6, 1949 |
| 2,678,985 | Smith | May 18, 1954 |

FOREIGN PATENTS

| | | |
|---|---|---|
| 906,850 | France | Mar. 28, 1945 |